S. R. BRYANT.
Milk-Cooler.
No. 207,008. Patented Aug. 13, 1878.
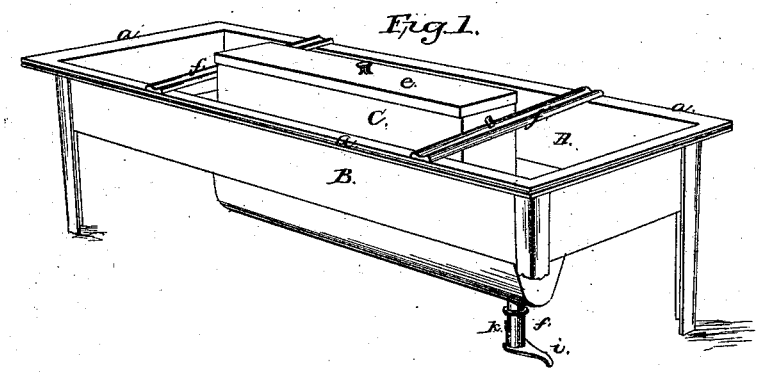
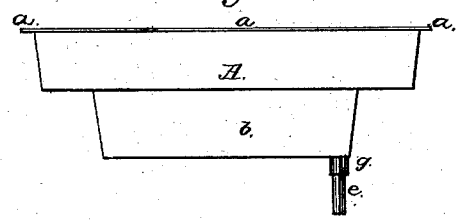
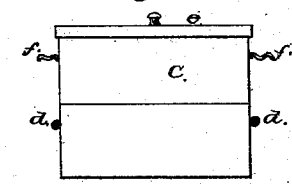
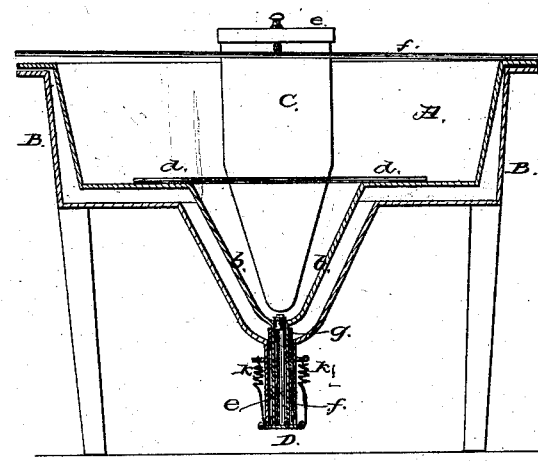
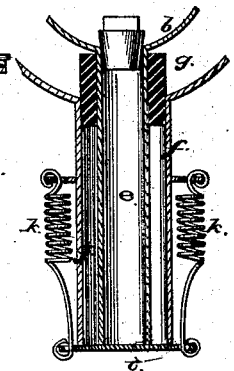
Attest:
C. W. S Anderson
William O. Colt
Inventor
Samuel R. Bryant

UNITED STATES PATENT OFFICE.

SAMUEL R. BRYANT, OF WATERFORD, PENNSYLVANIA.

IMPROVEMENT IN MILK-COOLERS.

Specification forming part of Letters Patent No. 207,008, dated August 13, 1878; application filed April 23, 1877.

*To all whom it may concern:*

Be it known that I, SAMUEL R. BRYANT, of Waterford, in the county of Erie and State of Pennsylvania, have invented a new and Improved Apparatus for Cooling or Heating Milk; and I do hereby declare that the following is a full, clear, and exact description of the same.

The invention is an improvement in the class of milk-coolers which are formed of an inner and outer vessel or receptacle, the two having corresponding shape, and being so connected that a space is left between them. In my milk-cooler the milk and water receptacles have a "well" or depression along the middle of their bottom, and I employ in connection with them a removable water-tank, which has a form suitable to adapt it to enter the said well, and is also provided with cross-bars which rest on the bottom of the milk-receptacle, and serve to support the tank in a vertical position, and also with gutters or tubes which serve to conduct water to and away from the tank. The milk and water receptacles are likewise provided with discharge-tubes, one of which enters and extends to the lower end of the other, so that both terminate at the same point, and are closed by a flat-faced spring-valve, as hereinafter described.

Figure 1 is a perspective view of the apparatus. Fig. 2 is a reduced side view of the milk-pan detached. Fig. 3 is a reduced side view of the water tank or cooler. Fig. 4 is a vertical cross-section of the apparatus. Fig. 5 is a detail, enlarged, of the discharge-tubes and valves.

A indicates a milk-pan, having a horizontal rim or flange, a, around its upper edge, and a depression or well, b, in its center. B is a water-vat of corresponding shape, but made of somewhat larger size, so as to leave a narrow space between them for containing water, which is admitted by any suitable means. C is a tank for containing ice or water, the same being a deep and narrow box, having such length as to adapt it to enter the well b. The cooler is supported by cross-bars d, attached to its ends and projecting far enough to rest on the ledges of the milk-pan A, as shown in Fig. 4.

The top, c, of the cooler C is made detachable to adapt it for receiving ice when the use of the latter is desirable; but ordinarily I propose to use running water as the cooling medium, and I convey it to the cooler at one end, and allow it to escape at the other end by means of gutters or troughs $f\,f$, arranged as shown in Fig. 1. The gutters may be attached to the cooler in any suitable manner, and short tubes may be employed to form the communication between them and the cooler.

It will be seen from the foregoing description that the milk-pan A is supported by its rim a, resting on the edge of water-vat B, and that the form of each of these vessels is such that I have a relatively large surface for cooling the milk, as compared with the cubical capacity of the milk-pan; also, that the body of milk is not only cooled exteriorly by the water in vat B which surrounds it, but interiorly by the tank C, so that its uniform temperature is quickly reduced to the desired point.

The tank C may be easily and quickly detached when required; but the location of its supports $d\,d$ prevents their obstructing the operation of skimming or removing the cream.

For drawing off the milk from pan A, it is provided with a tube, e, attached to the under side of the well b, and the water-vat B is similarly provided with a larger tube, $f$, which is coincidently located, so that when the pan is placed in the vat the tube e will enter tube $f$, as shown in Fig. 4. The milk-discharge tube is closed interiorly with a plug, $g$, and a sheathing or packing of rubber, h, is applied to it exteriorly at its upper end to form a tight joint between the two tubes. In other words, the tube e, with its rubber packing $g$, constitutes a removable but close-fitting stopper for tube $f$. The lower ends of both tubes are parallel to the same plane, and both are closed by valve D, which is attached to tube $f$ by spiral springs k, and has a handle, i, Fig. 1, to enable it to be drawn off from or pushed over the ends of the tubes, according as it is desired to allow or prevent discharge of either water or milk.

To discharge milk, the inner plug $g$ is raised or removed and the outer valve D opened. To draw off the water from vat B, the milk-pan A is raised sufficiently to withdraw the packed portion of tube e from the tube $f$, and the valve D opened, as before. Thus one valve, D, serves to close the discharge ends of nozzles of both tubes.

In place of using this application for cooling milk, it may be utilized for heating it, hot water being in such case supplied to tank C and vat B.

I am aware milk and water receptacles of a milk-cooling apparatus have been provided with a well or central depression, and also with discharge-tubes of unequal length, the longer tube having a stop-cock which controls the discharge from both tubes. I therefore disclaim such combination of parts.

What I claim is—

1. The combination, with the water and milk pans or receptacles A and B, having the corresponding wells or central depressions, of the removable water-tank C, having the form specified, and provided with gutters $f$ and cross-bars $d$, the latter being attached at such a point that the lower portion of the tank enters the well when the cross-bars rest on the bottom of the pan A.

2. The combination of the flat valve D and springs $k$ with the tubes $e\ f$ and pan A and vat B, one, $e$, of said tubes extending through the other, $f$, and terminating in the same plane, so that both discharge separately and are closed by the same valve seating against them, as set forth.

SAMUEL R. BRYANT.

Witnesses:
C. W. S. ANDERSON,
WILLIAM O. COLT.